United States Patent [19]

Horowitz

[11] Patent Number: 4,531,879
[45] Date of Patent: Jul. 30, 1985

[54] BOAT LOADING AND CARRYING DEVICE
[76] Inventor: Isadore Horowitz, P.O. Box 5916, Shreveport, La. 71135
[21] Appl. No.: 527,697
[22] Filed: Aug. 30, 1983
[51] Int. Cl.³ .............................................. B60R 9/04
[52] U.S. Cl. ............................ 414/462; 224/42.03 R; 224/310; 224/331
[58] Field of Search ................ 414/462; 224/42.03 R, 224/42.08, 310, 331

[56] References Cited

U.S. PATENT DOCUMENTS

| | | | |
|---|---|---|---|
| 2,775,381 | 12/1956 | Hare | 224/331 |
| 2,885,102 | 5/1959 | Duncan | 224/310 X |
| 3,048,291 | 8/1962 | Mabry | 414/462 |
| 3,064,841 | 11/1962 | Ellingson | 414/462 |
| 3,382,993 | 5/1968 | Bahrs | 414/462 |
| 3,460,693 | 8/1969 | Oldham | 414/462 |
| 3,642,157 | 2/1972 | Williams | 414/462 |
| 3,693,817 | 9/1972 | Van de Water | 414/462 |
| 3,819,074 | 6/1974 | Oliver | 414/462 |
| 3,871,540 | 3/1975 | Jenkins | 414/462 |
| 3,899,111 | 8/1975 | Binding et al. | 224/331 X |

*Primary Examiner*—Leslie J. Paperner
*Attorney, Agent, or Firm*—Lyon & Lyon

[57] ABSTRACT

A device for simple and easy loading and unloading of a small boat or other similar device onto the roof of a conventional automobile, such that, in the loaded position, the boat is centrally located on the automobile. A base structure is securely fastened to the roof of the automobile. A rack is pivotally attached to the base assembly so that the rack can pivot between an inclined position where the rack is angled downwardly and rearwardly from the roof of the automobile for loading and unloading, to its loaded position parallel to the roof of the automobile. The boat is pulled onto the rack by means of a rope and winch system.

2 Claims, 11 Drawing Figures

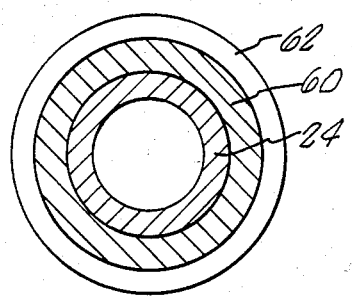
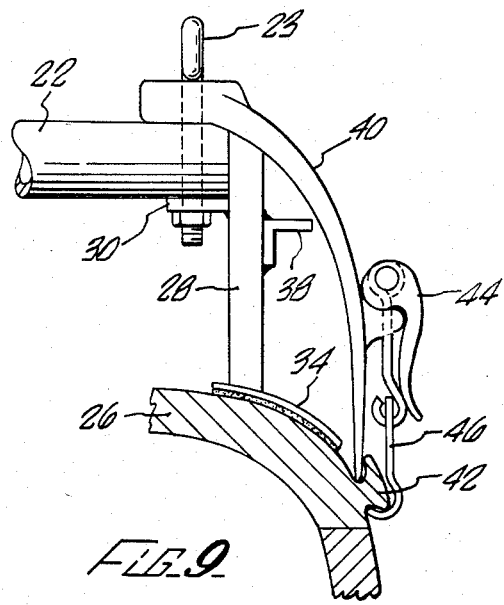
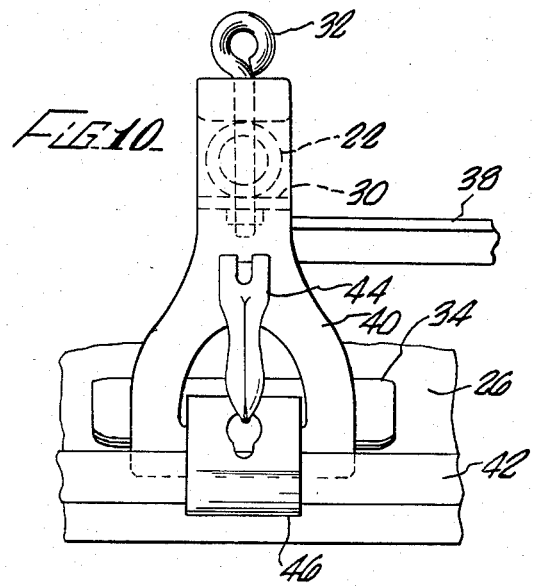
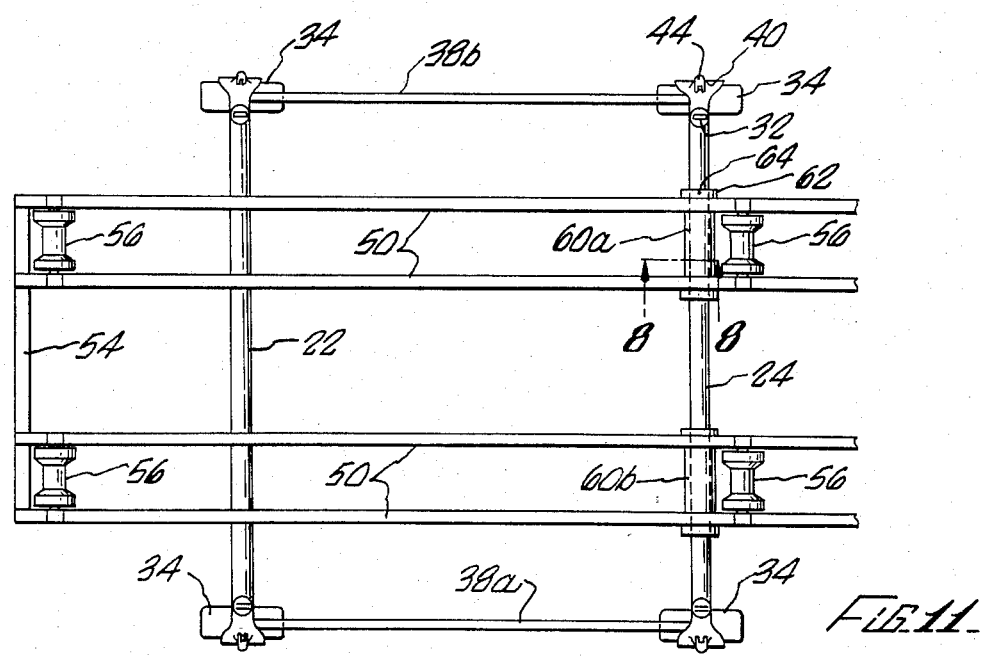

BOAT LOADING AND CARRYING DEVICE

BACKGROUND OF THE INVENTION

This invention pertains to devices for loading and carrying a boat or other similar object on the roof of a conventional automobile.

The problems associated with transportation of a fishing boat have long been recognized by fishermen. The most familiar way of transportation is by means of a boat trailer attached to and trailing behind the automobile. This, of course, works very well but is subject to a number of drawbacks. First, automobiles with trailers often must travel at reduced speeds and therefore travel time is increased. Second, trailers are expensive to purchase and maintain, and must be licensed and equipped with electrical systems. Third, an automobile with a trailer is less maneuverable than the automobile alone. Also, as more and more people are vacationing in large recreational vehicles behind which they tow a smaller automobile for runabout purposes, the use of a standard boat trailer is virtually impossible, since it would involve the recreational vehicle towing two other vehicles, first the car and then the boat trailer attached to the automobile. Accordingly, there has been and continues to be a need in the art for devices by which a fishing boat or other similar object can be loaded and carried directly on the roof or a conventional automobile.

In Mabry, U.S. Pat. No. 3,048,291, an automobile boat carrier is disclosed. The Mabry device, however, suffers from at least two serious disadvantages. First, the boat, when in the loaded position, is situated over the rear of the automobile, instead of being centrally located. This uneven weight distribution, which is particularly exacerbated by the fact that the heavy engine extends considerably to the rear of the automobile, contributes to instability of the automobile during use. With today's smaller and lighter automobiles, the Mabry device would be particularly disadvantageous. Another drawback of the Mabry device is that the winching system must not only pull the boat onto the carrier, but must also pull the entire carrier system into the upright position. This feature makes the system more complex, and it also puts more strain on the winch system itself, and upon the automobile to which the system is attached.

Another such device is disclosed in Oldham, U.S. Pat. No. 3,460,693. Although Oldham does provide for centralized carrying of the boat on the car, it again utilizes a complex system in which the winching mechanism must winch not only the boat, but the entire rack into position. Again, this requires an unnecessarily complex system, which places greater strain on the system and on the car.

SUMMARY OF THE INVENTION

This invention overcomes the drawbacks of the prior art in a simple device for loading and carrying a boat or similar object centrally on the roof of a conventional car. The device comprises generally a base attached to the roof of the car, a rack attached to the base, and winch means for pulling the boat onto the rack. In this invention, the rack does not move relative to the base, but merely pivots so that the complex mechanism necessary to provide for a movement of the rack relative to the base in Mabry and Oldham is eliminated. The boat is pulled onto the rack by winch and rope means in which the rope means are attached to the rear of the boat, rather than to the front of the boat as in Mabry and Oldham. This invention also provides for broad-based and secure attachment of the base to the automobile.

It is therefore the object of this invention to provide an improved boat loading and carrying device.

DESCRIPTION OF THE FIGURES

FIG. 8 is a view in cross-section taken along line 8—8 in FIG. 11 showing the manner in which the rack pivots about the base.

FIG. 9 is a view in isolation showing the manner in which the base is securely fastened to the roof of the automobile.

FIG. 10 is a side view of FIG. 9.

FIG. 11 is a top view of the base and a portion of the rack.

DESCRIPTION OF THE PREFERRED EMBODIMENT

Figure 1:
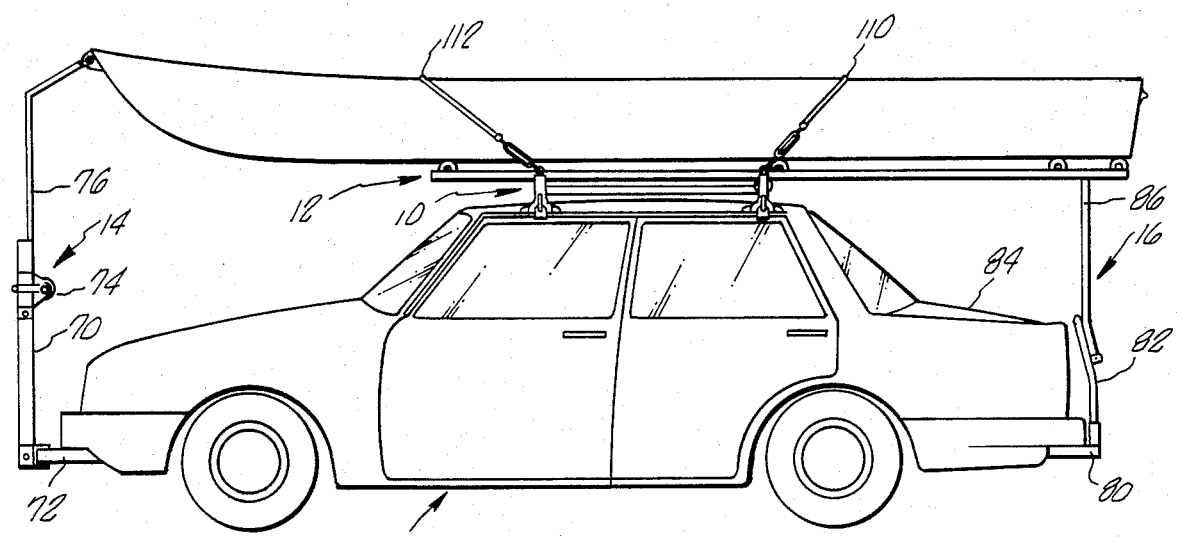
FIG. 1 is a side view of a preferred embodiment of this invention as it is attached to a conventional automobile, having the boat in place in the final, secured position.
Figure 2:
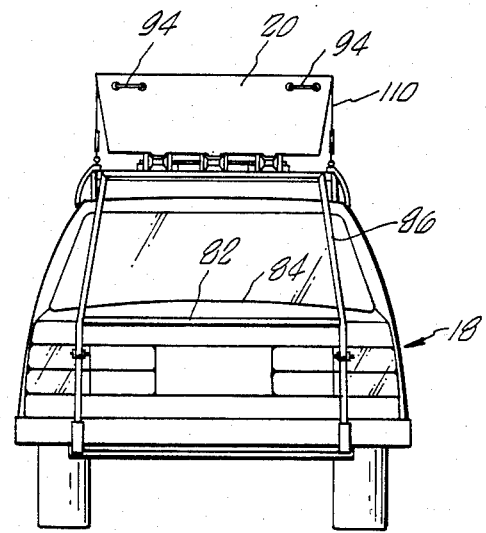
FIG. 2 is a rear view of the boat, the boat carrying device and the automobile.
Figure 3:
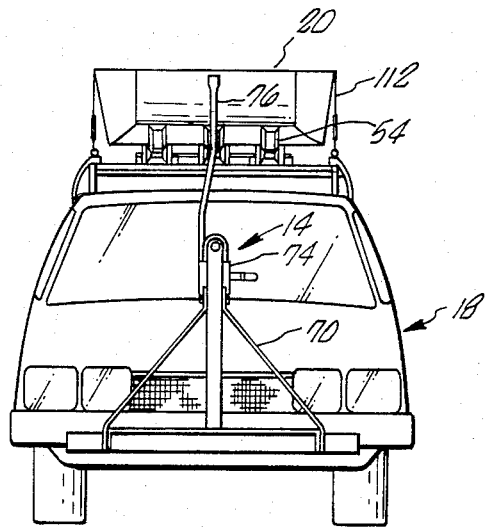
FIG. 3 is a front view of the boat, the boat carrying device and automobile.
Figure 4:
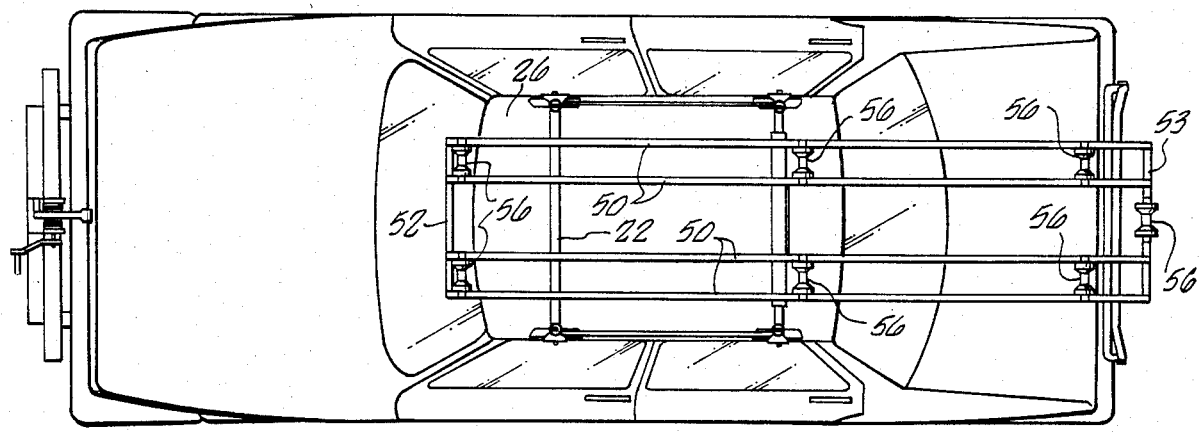
FIG. 4 is a top view showing the boat carrying device attached to the top of the automobile and in the upright position, but without the boat.

The various components of this invention consist of the base assembly 10, the rack assembly 12, the winch mechanism 14 and the trunk guard assembly 16, all generally designated by those references numerals. The boat which is to be loaded and carried on the invention is shown as 20. It should be immediately noted, however, that the invention to be described herein can be used not only with the boat, but any other object, similar in size and shape to a boat, which someone would want to load onto the top of an automobile 18.

Turning first to the base assembly 10, which is best shown in FIGS. 4, 9, 10 and 11, it has two cross-members 22 and 24, which in this embodiment, are constructed of tubular metal. The length of cross-members 22 and 24 is substantially the same as the width of the roof 26 of the automobile 18. It will be appreciated that the cross-members 22 and 24 could be made adjustable to accommodate usage of this invention on automobiles having different size roofs. Each of the cross-members 22 and 24 have at each end thereof a foot piece 28 (see FIG. 9), which extends downwardly from the cross-members 22 and 24 an appreciable distance such that the cross-members 22 and 24 will be positioned several inches above the roof 26 of the automobile 18. In this embodiment, the foot piece 28 is made separate from the cross-members 22 and 28 for ease of disassembly. It could easily be made of unitized construction. Here, however, a flange 30 is attached to and extends inwardly from each of the foot pieces 28 and upon which rests an end of the cross-members 22 and 24. A hole through the cross-members 22 and 24 communicates with a similar hole in flanges 30 such that the nut and bolt means 32 can be used to attach cross-members 22 and 24 to flanges 30 and hence to foot pieces 28.

At the other end of each foot piece 28 is attached a foot pad 34. The foot pad 34 is contoured to the shape of the roof 26. A rubber liner 36 is glued to the foot pad 34 to prevent damage to the roof 26 by the foot pad, as the foot pads 34, as is foot pieces 28, are preferably constructed of metal. Reinforcement bars 38a and 38b are welded between foot pieces 28 on each side of the base assembly 10.

It will be appreciated that the base assembly 10 is designed such that the foot pads 34 are as widely spaced upon roof 26 as is reasonably possible to provide the maximum stabilization of the load upon the automobile. To further ensure a secure and stable load, means are provided for securely attaching base assembly 10 to the roof 26. An arm member 40 attaches to the base assembly 10 and extends downwardly therefrom to reside within the rain gutter 42. Again, the arm member 40 has been made a separate piece for ease of disassembly. It could just as easily have been made of unitized construction with base assembly 10. Here, however, the arm member 40 has a hole through which nut and bolt means 32 will extend to secure the arm member 40 to foot piece 28. An off-center, tensionable buckle 44, and hook 46, which hooks to the underside of rain gutter 42, operate to pull arm member 40 under tension down into rain gutter 44 and to secure it there. Looking at FIG. 10, it will be appreciated that the portion of arm member 40 which comes into contact with rain gutter 42 is made quite wide to stabilize the load and to spread the force of attachment over a considerable area to guard against damage to rain gutter 42. Similarly, hook 46 is made quite wide for the same purposes.

The rack assembly 12 consists of two pairs of elongate rods 50, (four such rods in all) to which a front crossbrace rod 52 and a rear cross-brace rod 53 are attached. Each pair of elongate rods 50 comprises a track for a runner 54 on the hull of boat 20 will reside. At three locations, more or less equally spaced along the length of these tracks between the elongate rods 50, is placed a roller 56 (six in all) which is rotatably attached by conventional means between the pair of elongate rods 50. The runners 54 travel along these rollers 56 as the boat 20 is pulled onto the rack assembly. It will be appreciated that the positioning of the elongate rods 50 can be modified to accommodate different configurations of the underside of the hull of the boat 20. Typically, having a pair of elongate rods 50 for the two outermost runners 54 on the hull of the boat will be sufficient. An additional roller 56 is centrally placed in the rear cross-brace rod 53 to accept and guide the middle runner 54 on boat 20.

As best seen in FIG. 11 and FIG. 8, the rack assembly 12 is made pivotable upon base assembly 10 by means of two sleeves, 60a and 60b, which are fitted over and are rotatable about cross-member 24. The first pair of elongate rods is attached by welding or by other conventional means to the first sleeve 60a, and the second pair of elongate rods 50 to the second sleeve 60b. Bushings 62 having a set screw 64 are used to position the sleeve 60a and 60b on the rear crossmember 24, one such bushing being placed on either side of each of sleeve 60a and 60b (four in all).

The winch mechanism 14 in the preferred embodiment is built into a conventional two bar assembly, attached by conventional attachment means 72 to the front frame of the automobile. A conventional winch 74 is attached by conventional means to the tow bar assembly 70. When the boat is in the fully loaded position, a metal rod 76 can be attached to the front of the boat and to the tow bar assembly to secure the boat in place.

Figure 5:
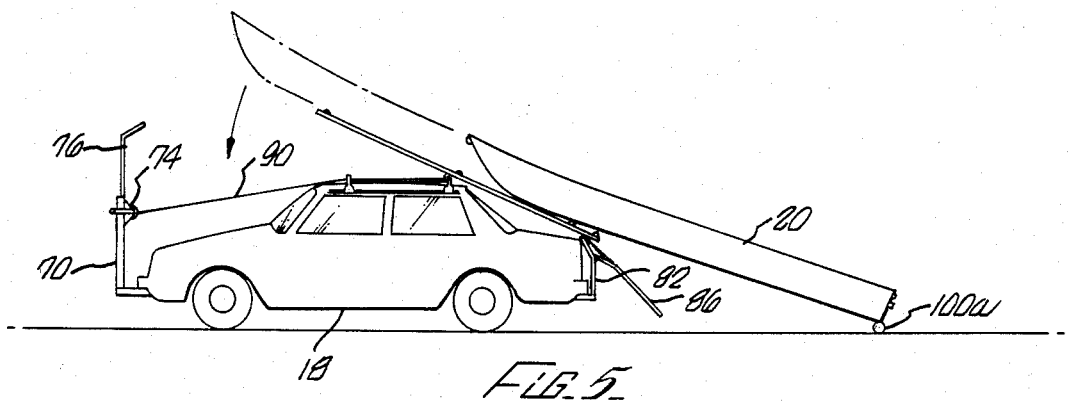
FIG. 5 is a side view of the boat, the boat carrying device and the automobile, showing the manner in which the boat is pulled onto the rack. The rack is in the inclined position. This figure illustrates, in shadow, how the boat is pulled onto the rack and how the rack then pivots to the upright or parallel position.
Figure 6:
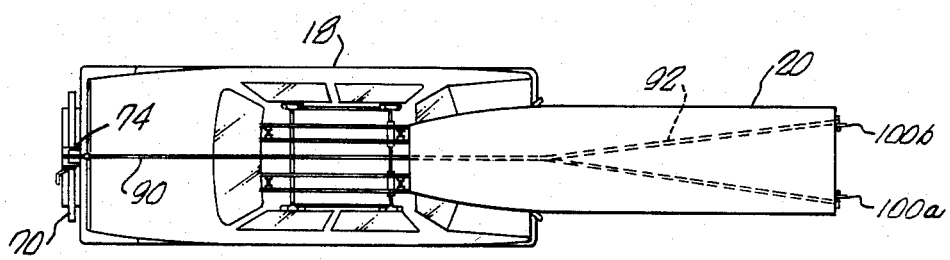
FIG. 6 is a top view of FIG. 5. The manner in which the rope extends from the winch through the base of the boat carrying device, along the bottom of the boat and attached to the rear of the boat is shown.
Figure 7:
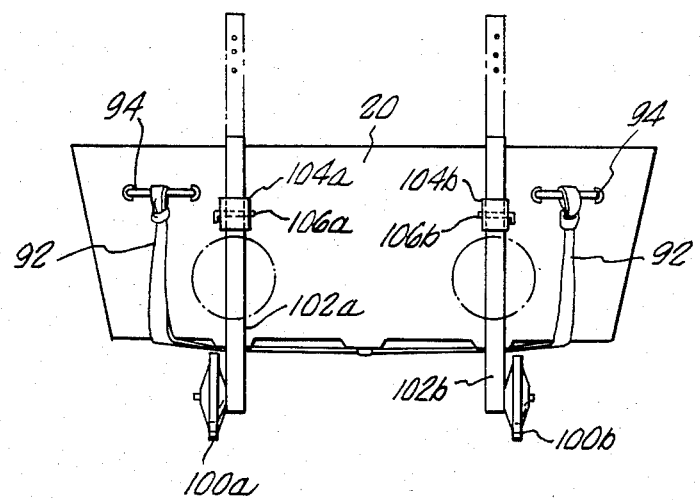
FIG. 7 is a rear view of the boat in FIG. 6 showing the manner in which the rope bridle is attached to the rear of the boat, as well as the extendable wheels which may be used to load or unload the boat off of or onto dry land.

The trunk guard assembly 16 is attached to the rear frame of the automobile by conventional attachment means 80. A U-shaped tubular metal bar 82 extends upwardly from the attachment means 80 above the rear trunk deck 84 of the car 18. Pivotally attached to the U-shaped bar is a second U-shaped bar 86 which is a rack support for rack assembly 12 when the second U-shaped bar 86 is in the upright position as seen in FIG. 1. During the loading and unloading operation, however, the second U-shaped rack support bar 86 pivots down to allow the rack assembly 12 to pivot down in the rear, as shown in FIG. 5. In this position, the first U-shaped trunk guard bar 82 remains above the trunk 84 to protect the trunk 84 from damage from rack assembly 12.

To load the boat, rope 90 is attached at one end to the winch 74. The rope is then thread under the front crossbrace rod 52, over cross-members 22 and 24, and over rear cross-brace rod 53 and thence attached to a bridle 92. The bridle 92 is then attached to the rear of the boat to handles 94a and 94b. The bridle assembly 92, whereby the rope 90, in essence, is split in two and attached at two different locations at the stern of the boat 20, is used to provide stability to the boat as it is being pulled onto the rack assembly 12. It is very important that the rope 90 and bridle 92 be attached to the stern of boat 20, rather than to its stem. If, rather than attaching the rope 90 and bridle 92 to the stern of the boat 20, it were attached to the stem, and pulled by a winch located at the front of the car, once the boat had been pulled to a position where the point of attachment of the rope 9 to the stem of the boat 20 were slightly higher than the base assembly 10, the winch would no longer pull the boat onto the rack assembly 12.

To allow the boat 20 to be unloaded onto or loaded off of dry ground as opposed to water, retractable wheels 100a and 100b may be added to the stern of the boat. The wheels 100a and 100b are attached to tubular rods 102a and 102b which are in turn inserted through brackets 104a and 104b on the stern. Pins 106a and 106b thrust through aligned apertures in the brackets 106 and the tubular rods 102 will hold the wheels in the retracted or extended position.

To load the boat, the rack support bar 86 is rotated to the down position such that the rack assembly 12 may pivot to its inclined position down and back. The rope 90 is threaded as outlined above and attached to the stern of the boat. To aid in the loading operation, a guide-rope (not shown) may be attached to the stem of the boat for the operator to hold in hand to guide the boat onto the rack assembly 12 as the rope 90 is pulled in by winch 74. As the boat 20 is pulled onto the rack and past the point of balance; that is, the point where the weight of the rack assembly and the boat in front of the rear cross-member 24 is greater than the weight behind it, winching is slowed so that the rack assembly 12 gently pivots down in front into the position parallel to the roof of the auotmobile. Once that is accomplished, winching can continue until the boat 20 is pulled fully into position. At that point, the rack support bar 86 is brought up into position underneath and supporting the rack assembly 12. Tie-down straps 110 and 112, and front metal rod 76 may be added to further secure the load.

To unload the boat, the operation is reversed. First, rack support bar 86 is rotated to the down position, and the tie-down straps 110 and 112 and the metal rod 76 are removed. The rope 90 is attached and sufficient slack is given in the rope so that the boat 20 may be pushed manually along rack assembly 12 to the balance point. At that point, additional slack in the rope can be slowly let out for a controlled unloading of the boat 20.

It will be appreciated that by using the retractable wheels, removing the boat from water can be quickly and easily accomplished. The wheels are extended in the water and a rope attached to the stem of the boat pulled up out of the water onto the rack. The automobile can be driven out of the docking area onto dry land where the loading operation can be easily and dryly completed.

It will also be apparent to those skilled in the art that the winch 74 can be mounted directly onto the base 10 or to the rack 12.

Although specific embodiments of the invention have been depicted and described, it will be apparent to those skilled in the art that many more modifications upon those embodiments are possible without departing from the inventive concepts claimed herein. Accordingly, this invention is not to be limited to the specific embodiments set forth above, but is of the full breadth and scope of the appended claims.

What is claimed is:

1. A device for loading and carrying a boat or similar object centrally on the roof of a conventional automobile, the device comprising
   (a) a base having means for attaching said base securely and centrally to the roof of an automobile;
   (b) rack means, for holding the boat, pivotally attached to said base, said rack means pivotable between a first position inclined downwardly relative to the roof of the automobile and a second position substantially parallel with the roof of the automobile;
   (c) means attached to the automobile for pulling the boat onto said rack means;
   (d) guard means attached to the automobile for preventing the rack means from hitting and possibly damaging the automobile when said rack means is in its first position, said guard means comprising a guard attached to the automobile and extending upwardly above the trunk or hood of the automobile to provide a stop against which said rack will rest when said rack is in its first position; and
   (e) rack support means pivotally attached to said guard for supporting said rack means in its second position, said rack support means pivotable between a first position in which said rack support means extends upwardly and supports said rack means in its second position, and a second position in which said rack support means is down such that said rack means can pivot to its first position.

2. The device of claim 1 wherein said means for pulling the boat onto said rack means comprises rope means attached at a first end to winch means for decreasing the length of said rope means and attachable at a second end to the boat to be loaded.

* * * * *